(12) United States Patent
Eichner et al.

(10) Patent No.: US 7,698,203 B1
(45) Date of Patent: Apr. 13, 2010

(54) RING-FENCING ASSETS OF AN INVESTMENT FUND

(75) Inventors: Stewart Eichner, Ridgefield, CT (US); F. Claiborne Johnston, New York, NY (US); Jeffrey Hugh Macdonnell, Glen Ridge, NJ (US)

(73) Assignee: Morgan Stanley, New York, NY (US)

( * ) Notice: Subject to any disclaimer, the term of this patent is extended or adjusted under 35 U.S.C. 154(b) by 185 days.

(21) Appl. No.: 11/725,256

(22) Filed: Mar. 19, 2007

Related U.S. Application Data

(60) Provisional application No. 60/861,843, filed on Nov. 30, 2006.

(51) Int. Cl.
*G06Q 40/00* (2006.01)
(52) U.S. Cl. .................................................. 705/36 R
(58) Field of Classification Search ..................... 705/36
See application file for complete search history.

(56) References Cited

U.S. PATENT DOCUMENTS

| | | | | |
|---|---|---|---|---|
| 5,950,175 | A * | 9/1999 | Austin | 705/36 R |
| 7,315,836 | B1 * | 1/2008 | Elliott | 705/36 R |
| 2002/0019793 | A1 * | 2/2002 | Frattalone | 705/36 |
| 2005/0044019 | A1 * | 2/2005 | Novick et al. | 705/35 |
| 2005/0216388 | A1 * | 9/2005 | Houghton et al. | 705/35 |
| 2007/0027791 | A1 | 2/2007 | Young et al. | |

OTHER PUBLICATIONS

Aird-Brown et al.: The PGE Filing: What would have happened in the UK, Jul. 1, 1991, Turnaround Management Association, Chicago HQ, pp. 1-8.*
Mitchell et al.: Commission staff analysis of ring-fencing measures for investor-owned electric and gas utilities, Feb. 18, 2005, pp. 1-34.*
Avila-Nores, Matias, "Ring-Fencing and Other Bankruptcy-Remote Techniques," Available at SSRN: http://ssrn.com/abstract=406781 or DOI: 10.2139/ssrn.406781, Spring 2002.

* cited by examiner

*Primary Examiner*—Hani Kazimi
*Assistant Examiner*—Bijendra K Shrestha
(74) *Attorney, Agent, or Firm*—K&L Gates LLP

(57) ABSTRACT

Methods and systems for ring-fencing assets of an investment fund. The investment fund may issue interest of a first interest type in the fund to investors. When one or more investors seek to redeem their interests and the aggregate value of the interest sought to be redeemed is greater than the redemption amount available from the fund, the redemption-requesting investors may be issued interests in the fund of a second interest type. The quantity and value of the interest of the second type issued may be based on the pro rata share of the redemption-requesting investor's interest in the assets of the fund at the time that the interests are issued. The assets of the fund as of the conversion date are ring fenced. Income attributable from the ring-fenced assets after the conversion date and/or proceeds derived from the disposition of ring-fenced assets after the conversion date is distributed to the investors having the second interest type. This process of income distribution and redemption of interests upon liquidation of investments may continue until all investments within the ring fence have been liquidated.

20 Claims, 4 Drawing Sheets

RING-FENCING ASSETS OF AN INVESTMENT FUND

CROSS-REFERENCE TO RELATED APPLICATIONS

This application claims priority to provisional application Ser. No. 60/861,843, entitled "Fund Structure" by Stewart Eichner, et al., filed Nov. 30, 2006, which is hereby incorporated by reference.

BACKGROUND

Investment funds often provide a vehicle for investors to invest in assets that may be liquid, illiquid, or a combination thereof. For example, an investment fund may hold liquid securities and illiquid real property. Additionally, some investment funds provide their investors with periodic liquidity through redemption procedures set forth in the fund's constitutional and operating documents. When such a fund is faced with a redemption request by an investor and the fund does not have enough liquid assets to satisfy the redemption request, the fund could be forced to dispose of at least a portion of its illiquid assets. Such a sale may be undesirable because the timing of the sale would be sub-optimal, which would have an adverse impact on the fund and on the investors that are not making a redemption request. Thus, there is a need for a fund structure that employs a strategy for providing liquidity or partial liquidity to investors who request redemptions when the fund does not have sufficient liquid assets to meet the aggregate redemption requests made by the fund's investors.

SUMMARY

In one general aspect, the present invention is directed to methods and systems for ring-fencing assets of an investment fund. According to one embodiment, the investment fund may issue interests of a first interest type in the fund to investors. When one or more investors seek to redeem their interests and the aggregate value of the interest sought to be redeemed is greater than the redemption amount available from the fund, the redemption-requesting investors may be issued interests in the fund of a second interest type. The quantity and value of the interest of the second type issued may be based on the pro raw share of the redemption-requesting investor's interest in the assets of the fund at the time that the interests are issued (the "conversion date"). The assets of the fund as of the conversion date are ring fenced. Income attributable from the ring-fenced assets after the conversion date and/or proceeds derived from the disposition of ring-fenced assets after the conversion date is distributed to the investors having the second interest type. This process of income distribution and redemption of interests upon liquidation of investments may continue until all investments within the ring fence have been liquidated.

BRIEF DESCRIPTION OF THE DRAWINGS

Further advantages of the present invention may be better understood by referring to the following description taken in conjunction with the accompanying drawings, in which.

DESCRIPTION

Various embodiments of the present invention are directed to fund structures that include open-ended funds that acquire and hold assets (e.g., interests in real property). Various embodiments provide investors in the funds with the ability to recoup all or a portion of their investments in a fund through "ring fencing." Employing such a strategy, for example, an investor in a fund, who cannot recoup all or a portion of his investment during a redemption period because of insufficient cash and liquid holdings of the fund, may lock his current interest in the fund such that the investor's interest will not be affected by any change in investment strategy employed by the fund in the future. As used herein, the term "ring fence" or "ring fencing" means a strategy that is used by a fund to segregate certain fund assets from subsequently-acquired fund assets. In such a situation, the fund grants the investor an interest representing a pro rata share of the current assets and associated liabilities of the fund as of a certain date (the "conversion date," which may be at or near the redemption date). Such interest entitles the investor to an amount based upon: (i) income attributable to such assets acquired by the fund after the conversion date; and/or (ii) amounts attributable to disposition of such assets after the conversion date. In such an arrangement, for example, the fund does not need to sell assets when faced with redemption requests that are greater than an amount the fund manager makes available for fund redemption (e.g., based on available cash and other liquid assets of the fund).

Figure 1:
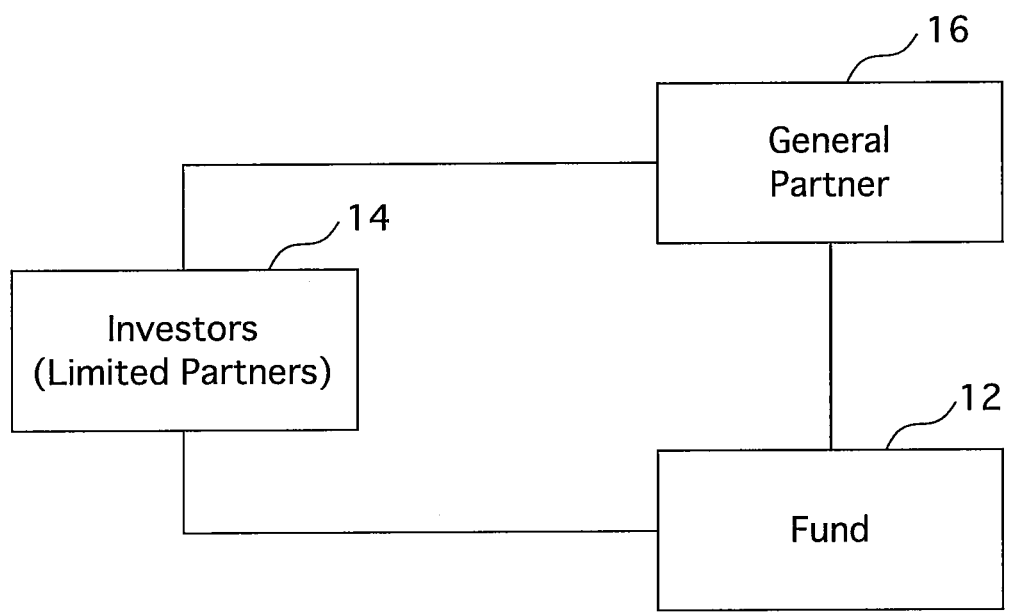
FIG. 1 is a diagram illustrating a structure that may be used in conjunction with an investment fund according to one embodiment of the present invention.

FIG. 1 is a diagram illustrating a structure 10 that may be used in conjunction with an investment fund according to one embodiment of the present invention. In the structure 10, a fund 12 owns the assets, either directly or through, for example, a subsidiary holding vehicle, and investors 14 own interests in the fund 12. In various embodiments, the assets may be, for example, securities of private and public real property related companies and portfolios of real property and real property related assets in, for example, growth/emerging markets, distressed markets, and developed markets. The fund 12 may be structured as, for example, one or more limited partnerships. In the structure 10, a general partner 16 manages the fund 12. The general partner 16 may receive a management fee and an incentive allocation or other performance-based fees from the fund 12 and may decide how to invest and dispose of the assets of the fund 12. In various embodiments, the general partner 16 has the power to enter into contracts with third parties on behalf of the fund 12, determine whether and to what extent the fund 12 will make distributions (either in cash or in kind at its discretion) to or honor redemption requests from the investors 14, prepare and distribute annual reports to the investors 14, file tax returns and other reports required by governmental agencies, and any other activity in connection with management of the fund 12. In various embodiments, sub-advisors (not shown) and/or third-party fund managers (not shown) may handle day-to-day management of the fund 12.

In various embodiments, the fund 12 is organized as a legal contractual relationship between its constituent investors through admission as partners in a limited partnership, members in a limited liability company, etc. In such an arrangement, all property that is acquired by, conveyed into or vested in the name of the fund 12 is held by and in the name of the fund 12 or its subsidiaries. Also, any debt or obligation incurred by the general partner 16 in the conduct of the business of the fund 12 is a debt or obligation of the fund 12 and the general partner 16 is liable for the debt or obligation to the extent that the fund 12 has insufficient assets.

In various embodiments, the fund 12 offers and sells limited partnership interests in the fund 12 to qualified prospective investors 14 that, upon admission to the fund 12, will become limited partners of the fund 12. Interests in the fund 12, referred to hereafter as "Fund Units," may be initially issued in series at an initial purchase price based on, for example, an artificial value. Subsequent Fund Units may be issued based on, for example, the net asset value (NAV) of the fund 12. Fund Units are issued by the fund 12 upon the making of subscription payments. In various embodiments, initial Fund Units may be issued and subsequent payments may increase the capital account for such Units. In various embodiments, the Fund Units may be notional interests. In various embodiments, the Fund Units may be, for example, shares of common equity, shares of preferred equity, partnership interests, units, options, derivatives, stock appreciation rights, limited liability company interests, limited liability partnership interests, convertible interests, phantom shares, convertible debt instruments, debentures, etc.

In various embodiments, in the event that an investor 14 requests redemption of Fund Units that are unable to be redeemed, in whole or in part, because of insufficient available cash or liquid assets on hand by the fund 12 for redemption requests, the unredeemed Fund Units of the investor may be converted to Class R Units unless, in various embodiments, the investor 14 has specifically requested in its redemption request that its unredeemed Fund Units not be so converted. If the investor requests not to have its interests converted, the redemption request for the unredeemed interests may be withdrawn or the investor may have the option to renew the redemption request for the unredeemed interest at the next redemption period. As used herein, the term "Fund Units" includes an interest in the fund 12 that is not a Class R Unit. Under certain circumstances and with approval of the general partner 16, an investor 14 may elect to convert Fund Units to Class R Units without submitting a redemption notice, and such Class R Units will not be subject to redemption other than through disposition of assets allocable to such Class R Units.

In various embodiments, the investors 14 may request the redemption of some or all of their Fund Units (e.g., with at least ninety days' prior written notice to the general partner 16 unless the general partner 16 waives such notice in its sole discretion), as of the close of business on a specified date (e.g., after the expiration of a lock-up period, for example on or after the day immediately prior to the three-year anniversary of the issuance of such Fund Units).

In various embodiments and by way of example, "available cash" as of a particular redemption date means: (i) 50% of cash or cash equivalents of the fund 12 on hand as of the redemption date; (ii) 75% of proceeds of subscription payments to be received by the fund 12 on or about the redemption date (and cash available to be called from commitment amounts); (iii) 90% of the cash proceeds from sales of investments (other than investments, or portions thereof, allocated to series of Class R Units) made within 90 days prior to the redemption date; (iv) 10% of the available credit under the fund's 12 credit facility (or other source of permanent fund-level financing) as of the redemption date; and (v) any other amounts in the sole discretion of the general partner 16; less any amounts used to pay or reserved in respect of expenses or other obligations of the fund 12 and any cash allocable to Class R Units. The percentages discussed herein are exemplary in nature and it can be understood that other percentage values may be used in conjunction with various embodiments of the present invention.

In various embodiments, if the general partner 16 determines, in its sole discretion, that the conversion of a certain number of Fund Units to Class R Units could impose an obligation on the fund 12 or the holders of Fund Units (other than Class R Units) as a result of legal, tax, regulatory, or other considerations, the general partner 16 may partially or fully limit the number of Fund Units that may be converted to Class R Units. Any Fund Units that are converted may be allocated ratably among the investors 14 based on, for example, the net asset value (NAV) of the Fund Units that would otherwise have been converted, and all other Fund Units will not be converted and will remain outstanding. Alternatively, the general partner 16 could allocate all available Class R Units in order of the redemption notices received by the general partner 16.

In various embodiments, Class R Units are issued in series to correspond to the series of Fund Units to which they relate. One or more new series of Class R Units may be established each time Fund Units are converted into Class R Units.

Upon conversion, each series of Class R Units is allocated a pro rata portion of each asset of the fund 12 (other than cash and cash equivalents and any assets previously allocated to other series of Class R Units) and an amount of notional indebtedness (and other liabilities) of the fund 12 as of the conversion date, resulting in such series of Class R Units having an NAV equivalent to the NAV of the Fund Units which were converted into such series immediately prior to such conversion.

Assets of the fund 12 acquired after the date on which a series of Class R Units is issued will not be allocated to such series of Class R Units, other than assets in respect of currency hedging attributable to assets already allocated to such series of Class R Units. Each series of Class R Units is allocated its pro rata portion of the appreciation and depreciation of the assets allocated to such series.

In various embodiments, each series of Class R Units is charged interest from time to time on the outstanding notional indebtedness allocated to such series at the fund's 12 average rate of interest as determined by the general partner 16. If there is insufficient cash allocated to a series of Class R Units, the outstanding notional indebtedness allocable to such series is increased by the amount of any unpaid interest. Any change in the indebtedness of the fund 12 after the date on which a series of Class R Units is issued will have no effect on the Class R Units.

In various embodiments, Class R Units are subject to a management fee charged by the general partner 16. If insufficient cash is allocated to a series of Class R Units, the management fee is paid by the fund 12 and the outstanding notional indebtedness allocable to the series of Class R Units is increased by the amount of the management fee.

In various embodiments, Class R Units remain subject to an incentive allocation payable to the general partner 16. The general partner 16 receives Incentive Allocation Units in respect of the fund 12 generally, and an amount of cash (and/or, in the general partner's 16 sole discretion, a pro rata portion of each asset allocated to the series of Class R Units) in an amount equal to the incentive allocation to which a series of Class R Units is subject will be reallocated away from the series of Class R Units to the general partner 16.

In various embodiments, proceeds from the disposition of assets allocated to a series of Class R Units are not reinvested by the fund 12; rather, all cash (net of transaction expenses) received from the disposition of any asset allocable to such series is applied in the following order: (i) to pay the management fee attributable to such series; (ii) to pay down any outstanding notional indebtedness allocated to such series; and (iii) to redeem some or all of the Class R Units of such series.

In various embodiments, as of the end of any fiscal quarter, the fund 12 may redeem all or a portion of any or all series of Class R Units at their current NAV (after reduction for any management fee and any accrued incentive allocation), provided that such redemptions are made in the order in which such series were issued. If only a portion of a series is redeemed, then a pro rata portion of each holder's Class R Units of that series or those multiple series of Class R Units (based on the NAV of such Units held by each holder) are redeemed. As discussed hereinabove, certain investors 14 may agree in advance with the general partner 16 to voluntarily convert their Fund Units to Class R Units and to not have such Class R Units subject to early redemptions. As a result, such Class R Units are not subject to redemption except through the disposition of assets allocated to such Class R Units.

The following provides an example of how the redemption process may work according to one embodiment of the present invention. Assume the fund 12 has ten (10) investors, all with equal interests in the fund. Further assume that the fund has ten (10) investments that are equal in value with an aggregate NAV of 1000 (meaning that each investment has a NAV of 100). Following the expiration of the lock-up period (during which investors cannot redeem their interests), two investors, Investor A and Investor B, decide that they want to exit the fund. As such, no later than the required notification date, Investors A and B would provide written notice to the general partner 16 indicating that they would like to redeem all of their interests in the fund (with an aggregate NAV of 200). Further assume that in their redemption notices, only Investor B indicated that it would like to ring fence any portion of its investment that is not redeemed.

On or near the redemption date, the GP computes the fund's available redemption cash. In this example, assume that the fund only has $100 of available redemption cash. In that case, the general partner may redeem Investors A and B a pro rata amount, whereby each receives $50 in cash, for one-half of their interests in the fund (thereby reducing the NAV of the fund to 900).

In this example, Investor A still has one-half of its original fund interests and continues to participate in all new investments made by the fund 12. Investor A may retain the option to renew its redemption request at the next redemption date.

On the other hand, Investor B does not continue to participate in new investments by the fund. In contrast, all of Investor B's remaining Fund Units are converted into Class R Units. As part of the conversion process, the general partner 16 may attribute a pro rata interest in all assets in the fund on the conversion date to Investor B's Class R interests. In this example, Investor B's Class R Units would have an aggregate NAV of 50, split evenly among the fund's ten (10) investments.

Further assume in this example that over the first three (3) months after the conversion date, the fund receives total income (including dividends from its current investments, operating income, etc.) equal to $10 from two (2) of the ten (10) investments. In that case, Investor B would receive 5.56% (or 50/900) of this income (as Investor B's Class R Units represent 5.56% of each investment). In the next three months assume that the fund sells one investment for $150. In that case, Investor B would receive $8.33 in redemption of the Class R Units attributable to that investment. This process of income distribution and redemption of interests upon liquidation of investments may continue until all investments within the ring fence have been liquidated.

Figure 2:
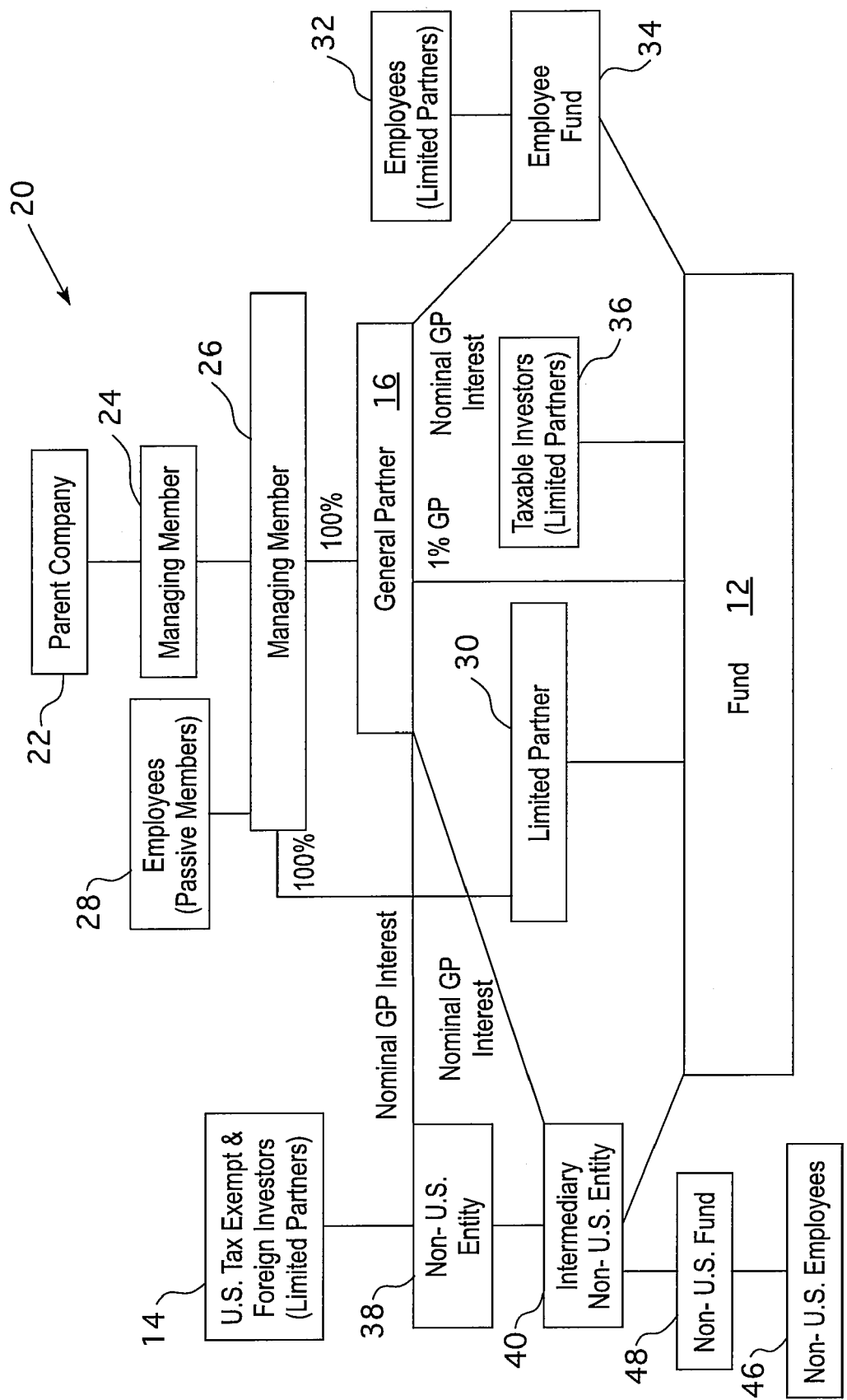
FIG. 2 is a diagram illustrating a structure that may be used in conjunction with an investment fund according to another embodiment of the present invention.

FIG. 2 is a diagram illustrating a structure 20 that may be used in conjunction with an investment fund according to another embodiment of the present invention. The structure 20 includes the fund 12, the investors (limited partners) 14, and the general partner 16 as described hereinabove in conjunction with FIG. 1. The structure 20 also includes a parent company 22 that owns a managing member 24. The managing member 24 may own, for example, 50% of a second managing member 26 which may be, for example, a limited liability corporation that is registered as an investment advisor with the U.S. Securities and Exchange Commission (SEC).

The structure 20 may also include passive members 28, in the form of employees of the parent company 22 or a subsidiary thereof, who may participate in the structure 20 by owning, for example, the 50% of the managing member 26 that is not owned by the managing member 24. The passive members 28 may be, for example, those employees of the parent company 22 or a subsidiary thereof who are involved in funding, diligencing, negotiating, finalizing and managing investments in the fund 12, but generally are not involved in the management of such managing member 26. A limited partner 30 is owned by the managing member 26 and may be, for example, a special purpose vehicle (SPV) that is organized for the purpose of facilitating investments in the fund 12 by the parent company 22. For example and by way of illustration, the parent company 22 may have a commitment to invest 25% of the aggregate capital commitments to the fund 12 less all capital commitments of the general partner 16.

Employees 32 of the parent company 22 or a subsidiary thereof may invest in the fund 12 via an employee fund 34. The employees 32 may be a subset of the employees of the parent company 22 or a subsidiary thereof such as, for example, those employees above a certain promotion level (e.g., above vice president), regardless of whether the employee 32 is involved in the structure 20. Non-U.S. employees 46 may invest in the fund 12 via a non-U.S. employee fund 48. Investors 36 that pay taxes in the U.S. are direct investors (limited partners) in the fund 12 and may be, for example, high net worth individuals and other taxable investors.

In the structure 20, the investors 14 represent tax-exempt U.S. investors and investors resident outside the U.S. The investors 14 make their investments into a non-U.S. domiciled entity (i.e., a feeder fund) 38. The entity 38 may be, for example, a limited partnership organized under the laws of, for example, the Cayman Islands. An additional intermediary non-U.S. domiciled entity 40 invests the money that it receives from the entity 38 in the fund 12. The entity 40 may be, for example, a limited partnership organized under the laws of, for example, Canada, and may provide the investors 14 with certain tax advantages for investments made in the fund 12.

Figure 3:
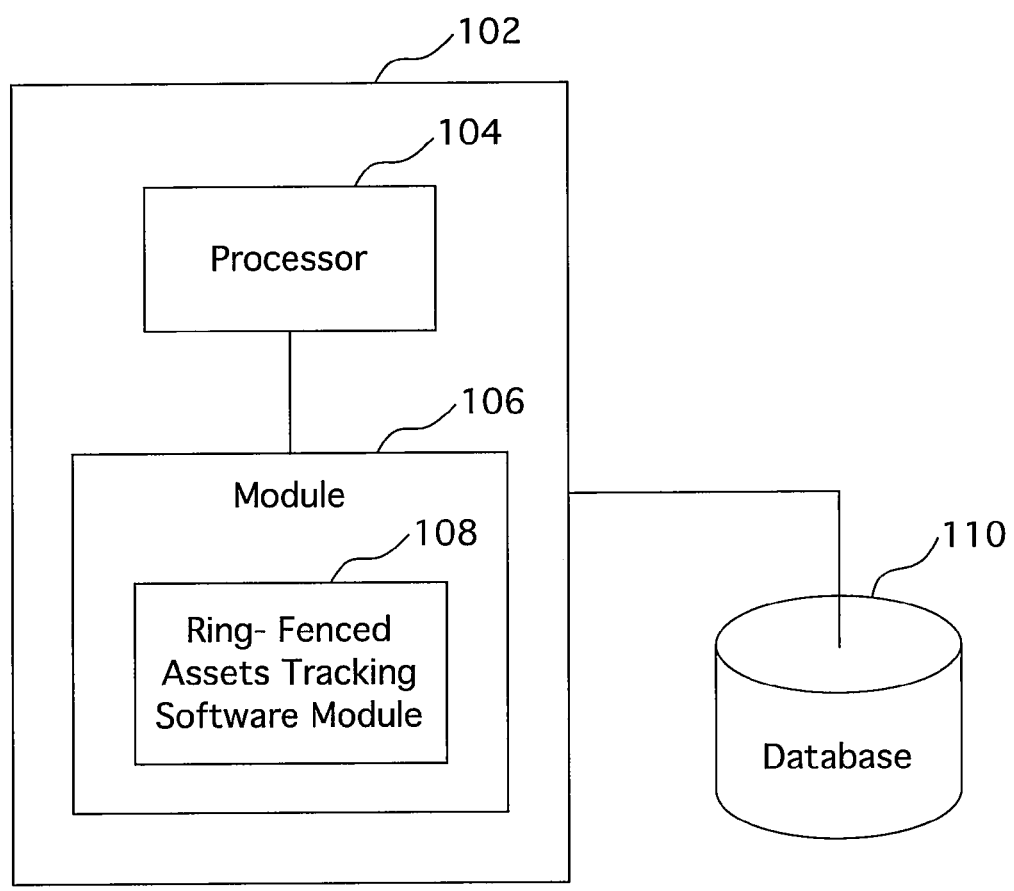
FIG. 3 is a diagram of a computer-implemented apparatus according to various embodiments of the present invention.

FIG. 3 is a diagram of a computer-based system 100 for tracking the different interests of the investors according to various embodiments of the present invention. The system 100 may comprise a computing device 102 that comprises a processor 104 and a memory 106. The memory 106 comprises a software module 108 having instruction code which, executed by the processor 104, causes the processor to track the interests of the investors (including their interests in Fund Units and Class R Units). The computing device 102 may be a personal computer, a laptop, a mainframe computer, a server, a workstation, or any other suitable computing device. The memory 106 may be any suitable type of computer-readable medium, such as, for example, random access memory (RAM), read-only memory (ROM), a magnetic medium, such as a hard drive or floppy disk, or an optical medium, such as a CD-ROM. A database 110 stores data relating to the investors and the assets of the fund.

The code of the software module 108, when executed by the processor 104, may cause the processor 104 to track Fund Units and Class R Units owned by each investor in the fund. It may also determine the quantities of Class R Units to be issued to investors whose Fund Units are converted to Class R Units. As described above, the Class R Units may be allocated on a pro rata basis based on the redemption-requesting investor's share of the assets of the fund as of the conversion date. In addition, the processor 104, when executing the code of the software module 108, may track the assets of the fund designated to the Class R Units as of the relevant dates (e.g., the conversion dates), including the income attributable to and/or proceeds derived from the disposition of the designated assets after the relevant dates. The code, when executed by the processor 104, may also cause the processor 104 to calculate distribution amounts for the Class R Units based on the income attributable to and/or proceeds derived from the disposition of the designated assets. The calculation distribution amounts may be stored in a storage unit (e.g., the memory 106 and/or some other storage unit) and/or may be transmitted via a network to another computer system.

Figure 4:
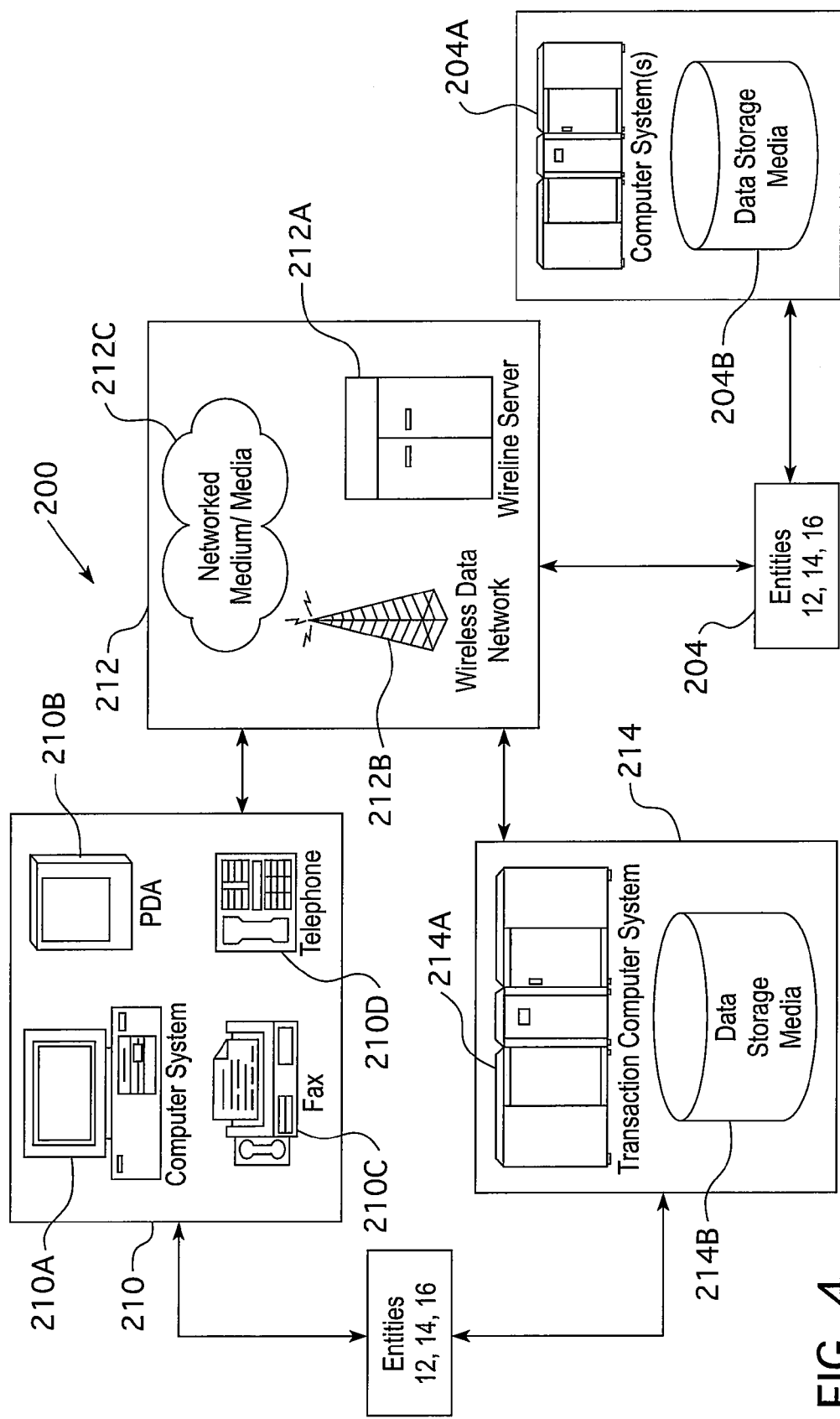
FIG. 4 is a diagram illustrating various embodiments of a system in which the present invention may be used.

FIG. 4 is a diagram illustrating various embodiments of a system 200 in which embodiments of the present invention may be used. As shown, two or more of the fund 12, the investors 14 and the general partner 16 may communicate and/or exchange data. In one aspect, two or more of the fund 12, the investors 14 and the general partner 16 can be operatively associated with one or more communications devices 210 such as, for example and without limitation, a computer system 210A, a personal digital assistant 210B, a fax machine 210C, and/or a telephone 210D (e.g., a wireline telephone, a wireless telephone, a pager, and the like), and/or other like communication devices. The communication devices 210 may permit two or more of the aforementioned entities to communicate between/among each other through one or more communication media 212, such as by use of electronic mail communication through one or more computer systems, for example. The communication media 212 can include, for example and without limitation, wireline communication means such as a wireline server 212A, a wireless data network 212B, and/or a connection through a networked medium or media 212C (e.g., the Internet). In addition, the two or more of the aforementioned entities may be operatively associated with one or more data processing/storage devices 214. Also, a third-party entity may be associated with the devices 214 on behalf of one or more of the aforementioned entities.

As illustrated in FIG. 4, one of the aforementioned entities may be operatively associated with a transaction computer system 214A, for example, and/or one or more data storage media 214B that can receive, store, analyze and/or otherwise process data and other information in association with communications that occur between/among other of the aforementioned entities. In another aspect, one of the aforementioned entities may be operatively associated with one or more computer systems 204A and/or one or more data storage media 204B. In various embodiments, the investors 14 may access any of the computer systems via an Internet-enabled connection (e.g., a web portal).

The term "computer-readable medium" as used herein may include, for example, magnetic and optical memory devices, such as diskettes, compact discs of both read-only and writeable varieties, optical disk drives, and hard disk drives. A computer-readable medium may also include memory storage that can be physical, virtual, permanent, temporary, semi-permanent and/or semi-temporary. A computer-readable medium may further include one or more data signals transmitted on one or more carrier waves.

The various portions and components of various embodiments of the present invention can be implemented in computer software code using, for example, Visual Basic, C, or C++ computer languages using, for example, object-oriented techniques.

While several embodiments of the invention have been described, it should be apparent, however, that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention as defined by the appended claims.

What is claimed is:

1. A computer-implemented method for facilitating the ring-fencing of assets of an investment fund comprising:
   tracking, by a computer system, first interests in the investment fund, wherein the first interests are held by investors in the investment fund, wherein the first interests represent a pro rata share of current assets and liabilities of the investment fund, wherein the computer system comprises a processor and a memory;
   tracking, by the computer system, second interests in the investment fund, wherein the second interests are issued on a conversion date to one or more of the investors of the investment fund who requested redemption of at least a portion of their first interests when the investment fund had insufficient assets to redeem the portion of the first interests for which redemption was requested, wherein the second interests provide holders thereof with economic rights associated with assets of the investment fund existing as of a the conversion date;
   calculating, by the computer system, distribution amounts to be distributed to the one or more investors holding the second interests, wherein the distribution amounts are calculated based on both (i) income received after the conversion date attributable to the assets of the investment fund existing as of the conversion date and (ii) proceeds derived after the conversion date from disposition of the assets of the investment fund existing as of conversion date but not unrelated assets of the investment fund acquired subsequent to the conversion date; and
   distributing the distribution amounts to the one or more investors.

2. The method of claim 1, wherein the second interests in the investment fund are issued to the one or more investors when the aggregate value of the first interests requested to be redeemed by the one or more investors is greater than the assets for the investment fund available to redeem the first interests for which redemption was requested.

3. The method of claim 2, wherein pro rata second interests in the investment fund are issued to the one or more investors.

4. The method of claim 2, wherein the investment fund is an open-ended fund.

5. The method of claim 2, wherein the first interests are partnership interests.

6. The method of claim 5, wherein the first interests are limited partnership interests.

7. The method of claim 6, wherein the second interests are a second class of limited partnership interests.

8. The method of claim 2, wherein the first interests are shares of equity.

9. The method of claim 2, wherein the first interests are limited liability company interests.

10. The method of claim 2, wherein the assets comprise illiquid assets.

11. A computer-implemented apparatus for tracking interests and distributions associated with an investment fund having ring-fenced assets, the apparatus comprising:
   a processor; and
   a memory in communication with the processor and storing instructions that when executed by the processor cause the processor to:
   track first ownership interests of the investment fund representing a pro rata share of current assets and liabilities in the investment fund, for investors of the investment fund that are issued first ownership interests;
   track second ownership interests of the investment fund for one or more of the investors that are issued second ownership interests, wherein the second interests are issued on a conversion date to the one or more investors of the investment fund that requested redemption of at least a portion of their first interests when the investment fund had insufficient assets to redeem the portion of the first interests for which redemption was requested;
   for assets of the investment firm existing as of the conversion date and designated as associated with the second ownership interests, track (i) income attributable to the designated assets received after the conversion date and (ii) proceeds derived from the designated assets after the conversion date; and
   determine distribution amounts for the one or more investors issued the second ownership interests based on (i) the income received after the conversion date attributable to the designated assets and (ii) the proceeds derived after the conversion date from the designated assets.

12. The apparatus of claim 11, wherein the determined distribution amounts are not based on fund assets acquired by the investment fund after the conversion date.

13. The apparatus of claim 12, wherein the memory further stored instructions which when executed by the processor causes the processor to determine the quantity of the second ownership interests to be issued to the one or more investors.

14. The apparatus of claim 12, wherein the investment fund is an open-ended fund.

15. The apparatus of claim 12, wherein the first interests are partnership interests.

16. The apparatus of claim 15, wherein the first interests are limited partnership interests.

17. The apparatus of claim 16, wherein the second interests are a second class of limited partnership interests.

18. The apparatus of claim 12, wherein the first interests are shares of equity.

19. The apparatus of claim 12, wherein the first interests are limited liability company interests.

20. The method of claim 1, wherein the second interests are issued with a net asset value equivalent to the net asset value of the first interests immediately prior to the conversion date.

* * * * *